United States Patent [19]

Suzuki et al.

[11] Patent Number: 4,841,311
[45] Date of Patent: Jun. 20, 1989

[54] LASER BEAM PRINTER WITH COMPACTLY ARRANGED PHOTOSENSITIVE ELEMENT, LASER BEAM EMITTING ELEMENT AND REFLECTIVE ELEMENT

[75] Inventors: Makoto Suzuki, Nagoya; Satoshi Urukawa, Suzuka, both of Japan

[73] Assignee: Brother Kogyo Kabushiki Kaisha, Aichi, Japan

[21] Appl. No.: 87,762

[22] Filed: Aug. 21, 1987

[30] Foreign Application Priority Data

Sep. 20, 1986 [JP] Japan ................................ 61-222319

[51] Int. Cl.⁴ ............................................... G01D 9/42
[52] U.S. Cl. .................................... 346/108; 346/160; 350/96.14
[58] Field of Search ................. 346/108, 107 R, 76 L, 346/160; 358/296, 300, 302; 350/96.14, 96.13, 96.11, 355, 356

[56] References Cited

U.S. PATENT DOCUMENTS

| | | |
|---|---|---|
| 3,795,433 | 3/1974 | Channin . |
| 3,841,733 | 10/1974 | Ebersole ............................. 346/108 |
| 3,870,394 | 3/1975 | Ploeckl . |
| 3,884,549 | 5/1975 | Wang et al. . |

(List continued on next page.)

FOREIGN PATENT DOCUMENTS

| | | |
|---|---|---|
| 0021993 | 6/1980 | European Pat. Off. . |
| 0021510 | 1/1981 | European Pat. Off. . |
| 0048441 | 3/1982 | European Pat. Off. . |
| 0050545 | 4/1982 | European Pat. Off. . |
| 0186166 | 7/1986 | European Pat. Off. . |
| 2359797 | 12/1977 | Fed. Rep. of Germany . |
| 3102972 | 11/1981 | Fed. Rep. of Germany . |
| 3443863 | 6/1985 | Fed. Rep. of Germany . |
| 51-8949 | 1/1976 | Japan . |
| 54-150153 | 11/1979 | Japan . |
| 55-40452 | 3/1980 | Japan . |
| 56-165122 | 12/1981 | Japan . |
| 58-106503 | 6/1983 | Japan . |
| 58-125025 | 7/1983 | Japan . |
| 58-147718 | 9/1983 | Japan . |
| 59-204027 | 11/1984 | Japan . |
| 2133900 | 8/1984 | United Kingdom . |

OTHER PUBLICATIONS

Matsunaga et al., "Optical Waveguide Isolator in Ti--Diffused LiNbO₃", *Optics Communications*, Dec. 1978, vol. 27, No. 3, pp. 361-364.

Tsao et al., "Photodeposition of Ti and Application to Direct Writing of Ti: LiNbO₃ waveguides", *Appl. Phys. Lett.*, vol. 42, No. 7, Apr. 1983, pp. 559-561.

Takizawa, "Electrooptical Fresnel Lens . . . " Applied Optics, vol. 22, No. 16, Aug. 15, 1983, pp. 2468-2473.

Delavaux et al., "Fundamental Limitations in the Performance of Chirped Grating Lenses on Planar Optical Waveguides", Jan. 1985, pp. 86-93, *IEEE Journal of Quantum Electronics*, vol. QE-21, No. 1.

Mikami, Osamu, "LiNbO₃ Coupled-Waveguided TE/TM Mode Splitter", Apr. 1, 1980, pp. 491-493, *Applied Physics Letters*, vol. 36, No. 7.

*Primary Examiner*—H. Broome
*Assistant Examiner*—Mark Reinhart
*Attorney, Agent, or Firm*—Oliff & Berridge

[57] ABSTRACT

A laser printer, wherein a laser beam emitting element is positioned close to a photosensitive element, employs a solid state deflective element for deflecting the laser beam. A laser beam optical path runs through a space between the laser beam emitting element and a reflective element, from which the optical path turns back to the photosensitive element beyond the laser beam emitting element. Thus, the laser beam can be efficiently deflected within a rather small capacity so that the printer can be small-sized. Additionally, since the printer has no mechanical moving parts, it is lightweight, efficient in operation, and free from mechanical adjustment requirements.

6 Claims, 3 Drawing Sheets

U.S. PATENT DOCUMENTS

| | | |
|---|---|---|
| 3,891,302 | 6/1975 | Dabby et al. . |
| 3,893,856 | 7/1975 | Bestenreiner et al. . |
| 4,000,937 | 1/1977 | Kaminow . |
| 4,070,092 | 1/1978 | Burns . |
| 4,175,827 | 11/1979 | McMahon . |
| 4,262,996 | 4/1981 | Yao . |
| 4,332,879 | 6/1982 | Pastor et al. . |
| 4,343,890 | 8/1982 | Phillips et al. . |
| 4,348,079 | 9/1982 | Johnson . |
| 4,375,312 | 3/1983 | Tangonan . |
| 4,394,060 | 7/1983 | Verber .............................. 350/96.13 |
| 4,396,246 | 8/1983 | Holman . |
| 4,413,270 | 11/1983 | Sprague . |
| 4,425,023 | 1/1984 | Matsumoto ........................ 346/108 |
| 4,440,468 | 4/1984 | Auracher et al. . |
| 4,445,759 | 5/1984 | Valette . |
| 4,468,084 | 8/1984 | Hutcheson ....................... 350/96.14 |
| 4,470,661 | 9/1984 | Matsumoto . |
| 4,478,483 | 10/1984 | Sprague . |
| 4,492,970 | 1/1985 | Lee ..................................... 346/108 |
| 4,523,803 | 6/1985 | Arao .................................. 350/96.14 |
| 4,547,262 | 10/1985 | Spillman, Jr. et al. . |
| 4,548,464 | 10/1985 | Auracher et al. . |
| 4,554,050 | 11/1985 | Minford et al. . |
| 4,611,883 | 9/1986 | Myer . |
| 4,614,408 | 9/1986 | Mir et al. . |
| 4,637,681 | 1/1987 | Yamamoto et al. . |
| 4,649,101 | 3/1987 | Thiel et al. .......................... 430/326 |
| 4,685,766 | 8/1987 | Nishimura ......................... 350/96.32 |
| 4,686,162 | 8/1987 | Stangl et al. ............................ 430/5 |
| 4,693,548 | 9/1987 | Tsunoi ................................ 350/96.14 |
| 4,705,346 | 11/1987 | Miyawaki . |
| 4,707,059 | 11/1987 | Ogura et al. . |
| 4,747,090 | 5/1988 | Yamashita et al. . |
| 4,755,036 | 7/1988 | Suzuki et al. . |

LASER BEAM PRINTER WITH COMPACTLY ARRANGED PHOTOSENSITIVE ELEMENT, LASER BEAM EMITTING ELEMENT AND REFLECTIVE ELEMENT

FIELD OF THE INVENTION

This invention relates to a laser printer, more particularly to a small-sized printer of improved operational efficiency.

BACKGROUND OF THE INVENTION

The conventional laser printer is equipped with a fixed laser beam emitting element of which emission is controlled on the basis of image information. A rotatable polygon mirror deflects the laser beam emitted from the laser beam emitting element so as to produce a desired image on the photosensitive element. In other words, the deflection of the laser beam depends both on the angle which its optical axis makes with the facet of the polygon mirror, and on a distance between the polygon mirror and the photosensitive element, enabling the two-dimensional image to be described on the photosensitive element.

However, the conventional laser printer is indispensably equipped with a polygon mirror including a mechanical moving system which requires a rather complicated rotation control mechanism, a drive assembly, a large motor, and so on in order to stabilize its rotation. Further, the laser beam deflected by this polygon mirror needs a relatively long distance to reach the photosensitive element in order to attain a sufficient deflection, so that the polygon mirror must be located at quite a long distance from the photosensitive element. For such reasons, the conventional laser printer is necessarily large and heavy, necessitates inconvenient precise adjustments of mechanical moving assemblies, and so on.

SUMMARY OF THE INVENTION

In light of the above, it is an object of the present invention to provide a laser printer which is small, lightweight and efficient.

The laser printer offered by the present invention is constituted such that the laser beam is emitted under control and reflected by a reflective element so as to be irradiated on the photosensitive element.

The reflective element is positioned far from the photosensitive element, with the laser beam emitting element therebetween. This photosensitive element is positioned close to the laser beam emitting element whose port faces toward the reflective element. A solid state deflective element is positioned along the optical path of the laser beam running from the laser beam emitting port toward the reflective element. That solid state deflective element deflects the laser beam within the variable refractive index.

In the present invention, the laser beam emitted from the laser emitting port is deflected by the solid state deflective element whose refractive index can be varied. The deflected laser beam is then reflected by the reflective element which is positioned in line with the laser beam emitting element and the photosensitive element, and thereafter makes the photosensitive element photoconduct. Therefore, an image is enlarged according to the deflection based on the total length of optical path running from the solid state deflective element to the reflective element and onto the photosensitive element.

BRIEF DESCRIPTION OF THE DRAWINGS

The above and other objects of the invention may be understood with reference to the accompanying drawings, in which.

DETAILED DESCRIPTION OF THE PREFERRED EMBODIMENT

The following explains one of the embodiments of this invention in conjunction with the attached drawings.

Figure 1:
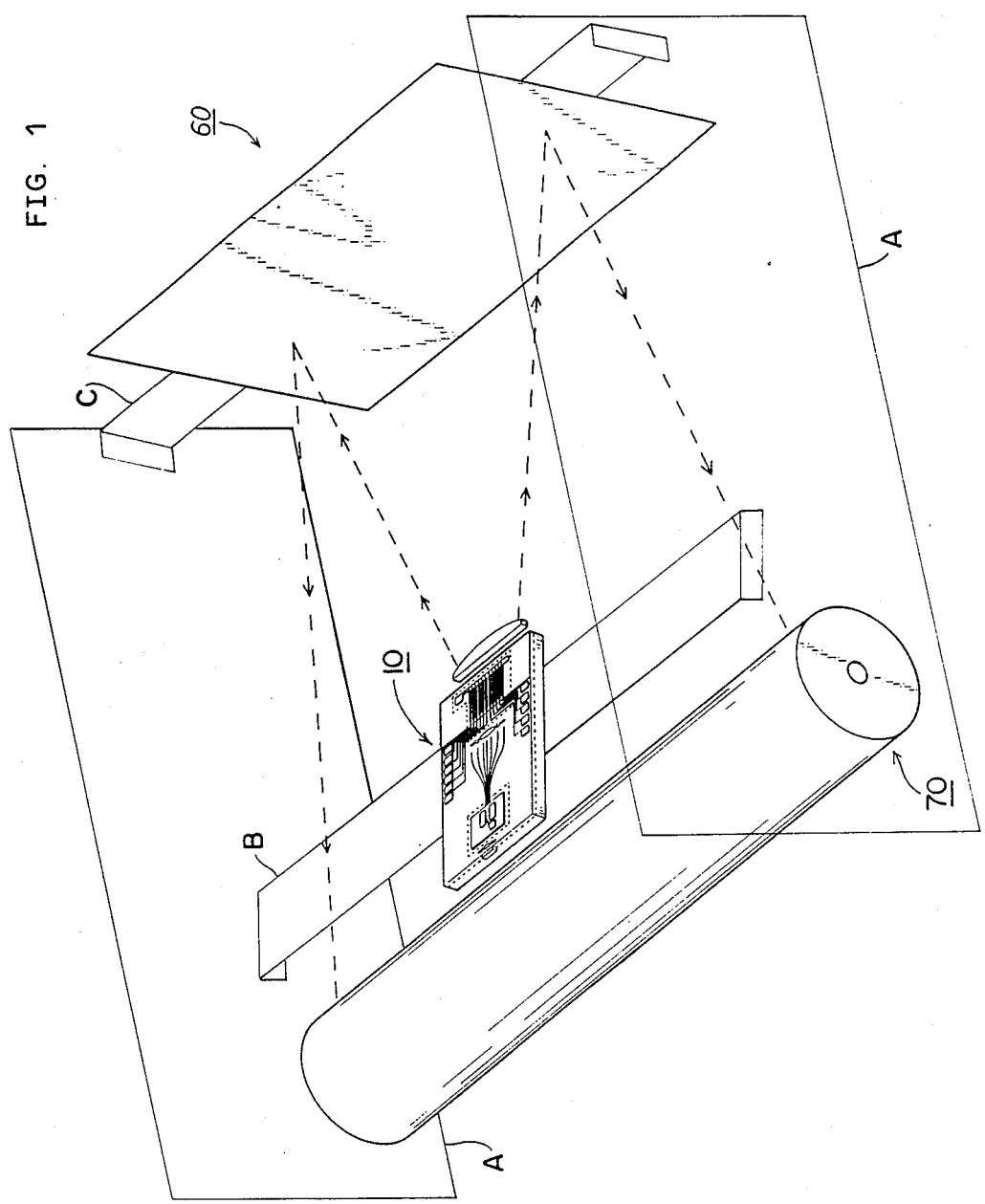
FIG. 1 is a schematic view illustrating a main structure of the laser printer embodied herein.

FIG. 1 is a schematic view of a main optical system structure embodied in a laser printer utilizing a xerographic process. Such peripheral components (not shown) as a cleaning blade, a plus-loading corona, a developer and so on are mounted near a photosensitive element 70 (explained later). However, they are not illustrated here since such constitution is already explicit in most of the laser printers. As shown in FIG. 1, a laser beam emitting element which generates a laser beam and a solid state deflective element which deflects the emitted laser beam to the desired deviation are mechanically fixed to the laser printer's body A by a supporting member B, and form a laser beam control device 10, by which the laser beam is generated, emitted, deflected, and then irradiated onto the photosensitive element 70 within the range shown by dotted line in FIG. 1.

A reflective element 60, which is fixed to the laser printer's body A by a supporting member C and faces the laser beam emitting port of the laser beam control device 10, perfectly reflects the laser beam with no absorption. The drum-shaped photosensitive element 70 is supported on the laser printer's body A behind the laser beam control device 10 and across the laser beam optical path which is reflected by the reflective element 60.

Figure 2:
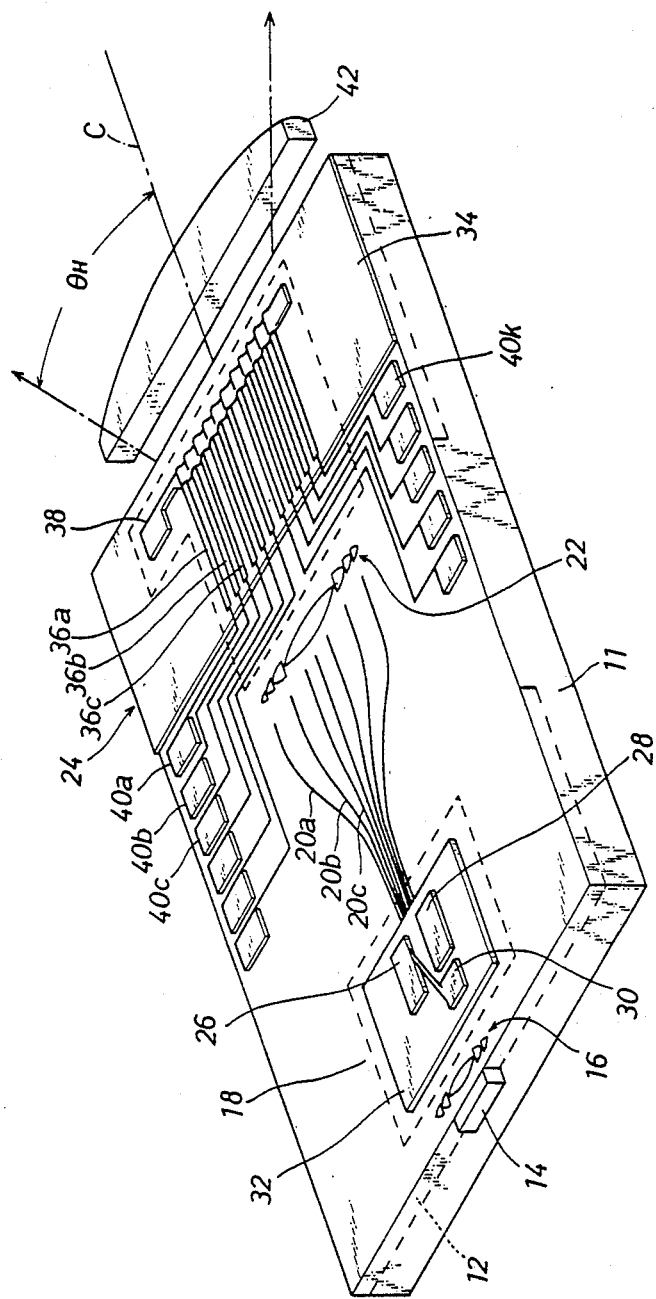
FIG. 2 is an enlarged detailed view of the laser beam control device.

FIG. 2 is an enlarged detailed view of the aforementioned laser beam control device 10. In conjunction with FIG. 2, a two-dimensional optical guide 12 is laid partially on a plate 11, which is made of electro-optics material such as lithium niobate crystal ($LiNbO_3$) and has a thickness of 0.5 mm approximately. The laser beam is guided correctly forward inside the two-dimensional optical guide 12, which is designed by its larger refractive index than any other sectional area on the plate 11 to vertically collimate the laser beams.

A semi-conductor laser chip 14 is fixed at one side of the plate 11. This semi-conductor chip 14 functions as a laser beam emitting element so as to emit the laser beam along center line C of the plate 11. The emitted laser beam is collimated into a parallel flux by a first set of Fresnel lenses 16 while running forward in the optical guide 12. Then in a first optical deflecting system 18, it is deflected selectively to one of various deflection angles. The laser beam is then guided into one of numerous three-dimensional optical guides, such as those denoted by numerals 20a, 20b, and 20c in the drawing, so as to bend each at a certain different distance from the center line C in accordance with the deflection angle produced at the first optical deflecting system 18. The beam is then refracted by a second set of Fresnel lenses 22 to the proper angle in accordance with the distance from center line C, and finally deflected to the desired deviation at a second optical deflecting system 24.

The first and second sets of Fresnel lenses 16, 22 utilize titan diffusion, proton conversion, and so on so as to form the Fresnel lenses, and produce the local heightened refractive index.

The first optical deflecting system 18 includes electrodes 26, 28, and 30 distributed on the plate 11 with a buffer layer 32 in between. The buffer layer 32 is laid in order to minimize absorption of the laser beam by electrodes 26, 28 and 30, and is made from a few μm thickness of transparent material, such as $SiO_2$, of lower refractive index than that of the two-dimensional optical guide 12. In the first optical deflecting system 18, the distribution of the refractive index variable Δn varies in response to the distribution of electrical field E. Due to the electrical field E; the flux of laser beam running parallel to center line C has different refractive indices, therefore, the laser beam is deflected toward the higher refractive index. If the voltages charged between the electrodes 26, 28 and 30 are gradually altered, the laser beam passing through the first optical deflecting system 18 is accordingly deflected into one of the three-dimensional optical guides such as 20a, 20b and 20c.

The numerous three-dimensional optical guides such as 20a, 20b and 20c offer predetermined optical guiding paths in which the refractive index is further heightened around their middle passage by the effect of Ti diffusion and the like. Their incident ends are positioned substantially parallel with each other on a line between the ejecting ends of electrodes 26 and 28 of the first optical deflecting system 18. Thus the laser beam passing through the first deflecting system 18 is guided into one of the numerous three-dimensional optical guides such as 20a, 20b and 20c, in accordance with its gradually variable deflection angles. Those numerous three-dimensional optical guides are arranged to correspond with the gradually changeable deflection angles. Each of the ejecting ends of the numerous three-dimensional optical guides 20a, 20b and 20c is positioned at a different predetermined distance from center line C, so as to guide the laser beam to the predetermined point. A plurality of such points is provided for the plurality of ejecting ends. Incidentally, in FIG. 2 the seven paths of the numerous three-dimensional optical guides such as 20a, 20b and 20c are illustrated by way of example only; more paths may be added.

Figure 3:
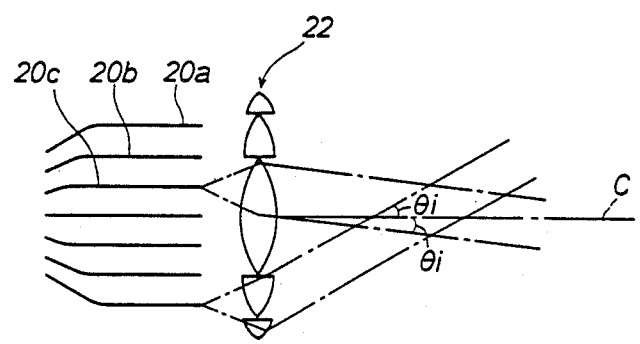
FIG. 3 illustrates a deflection performed in the laser beam control device.

The laser beams are then directed through the second set of Fresnel lenses 22 after running out of the ejecting ends of the numerous three-dimensional optical guides such as 20a, 20b and 20c, which lie parallel along the center line C. These laser beams are refracted as shown in FIG. 3, and therefore an incident angle θ i (the angle the laser beam optical path makes with center line C) corresponds to the position of the ejecting end of the particular three-dimensional optical guide 20a, 20b, 20c and so on, where the laser beam is guided. In other words, the incident angle θ i varies according to the distance which the containing ejecting end has from center line C.

A second deflecting system 24 comprises a plurality of resistor heating elements, some of them being denoted by numerals 36a, 36b and 36c in FIG. 2 (eleven of them are embodied in this embodiment), a common electrode 38, and a plurality of electrodes, some of them being denoted by numerals 40a, 40b and 40c. The resistor heating elements such as 36a, 36b and 36c, of a like resistance value, are located in parallel with center line C on a buffer layer 34 of the same material as the buffer layer 32. One end of each resistor heating element is connected to the common electrode 38, and the other end of each is connected to each of the electrodes such as 40a, 40b and 40c. When different voltages are applied between the common electrode 38 and the electrodes 40a, 40b, 40c and so on, in order to heat the resistor heating elements 36a, 36b, 36c and so on, each resistor heating element is supplied with different currents in succession, and thereafter a different Joule's heat is generated on each resistor heating element. Because of this, on the two-dimensional optical guide 12 by the side of resistor heating elements, a continuously variable temperature gradient is produced across the laser beam's optical path, namely perpendicular to the center line C, producing as well a refractive index gradient (a progress in which the refractive index continuously varies). By such refractive index gradient, the laser beams are continuously deflected upon passing through the second deflecting system 24, and are finally guided out of the laser beam control device 10 by the entire deflection angle θ H, including the incident angle θ i and the additional deflection angle given by the second deflecting system 24. Furthermore, a modifying lens 42 is fixed to the laser beam emitting port of the device 10 in order to vertically collimate beams towards the reflective element 60.

The laser beam properly deflected as described hereinbefore passes straight towards the reflective element 60 as shown in FIG. 1 and is then reflected toward the photosensitive element 70. The laser beam thus emitted by the deflection angle θ H is further deflected while passing through the space between the laser beam control device 10 and the reflective element 60, and after reflection it passes through the space between the reflective element 60 and the photosensitive element 70. Namely, the laser beam optical path runs totally quite a long distance for the purpose of larger deflection.

In this embodiment wherein a large deflection covering the whole width of the photosensitive element 70 can be attained as described above, the optical path of the laser beam runs from the laser beam control device 10 to the reflective element 60 and thereafter runs back from the reflective element 60 to the photosensitive element 70 beyond the laser beam control device 10. Therefore, only half of the total distance of the optical path is necessary from the reflective element 60 to the laser beam control device 10 and the photosensitive element 70 so as to attain similar deflection to that of the prior art. Furthermore, the laser printer embodied by the present invention requires no mechanical moving parts so that the apparatus can be small-sized, lightweight and free from maintenance, and improved in terms of operational efficiency.

Although this embodiment has the laser beam control device 10 on which the semi-conductor laser chip 14 and a solid state deflective element are fixed together, any other prior art solid state deflective elements may be similarly adopted, or each of those two elements may exist separately (for example, U.S. patent application Ser. No. 931,039 which was filed on Nov. 17, 1986).

Furthermore, in this embodiment a plane mirror is used as the reflective element 60, but alternatively a concave mirror or a convex mirror may be adopted in order to converge or diverge the laser beam more.

When the reflective element 60 is provided with those reflecting interfaces having different characters, this variety allows an easier enlargement or miniaturization of the image information. In these cases, such well-known techniques will be properly taken as a linear correction corresponding to the reflection of the laser beam.

Having described our invention as related to the embodiment shown in the accompanying drawings, it is our intention that the invention not be limited by any of the details of description, unless otherwise specified, but rather be construed broadly within its spirit and scope as set out in the accompanying claims.

What is claimed is:

1. A laser printer comprising:
   a laser beam emitting element for emitting a laser beam;
   a deflective element, with a variable refractive index, fixed to the laser beam emitting element for deflecting the laser beam emitted from the laser beam emitting element;
   a reflective element for reflecting the laser beam deflected by the deflective element; and
   a photosensitive element located adjacent the laser beam emitting element and spaced apart from the reflective element for being exposed by the laser beam reflected by the reflective element.

2. A laser printer according to claim 1, wherein the deflective element includes:
   a first Fresnel lens for collimating the laser beam of the laser beam emitting element;
   a first optical deflecting part for guiding and deflecting the laser beam collimated by the first Fresnel lens such that the refractive index is varied in response to a distribution of an electrical field;
   three-dimensional optical guides having entering and ejecting ends for receiving the laser beam passed through the first optical deflecting part into one of the entering ends in accordance with a deflected angle at the first optical deflecting part and guiding the laser beam to a corresponding ejecting end;
   a second Fresnel lens for refracting the laser beam passed through the three-dimensional optical guides in accordance with the distance between a center line and the position of the ejecting end at which the laser beam is ejected; and
   a second optical deflecting part including at least one resistor heating element for producing a continuously variable temperature gradient across a path of the laser beam which forms a refractive index gradient by which the laser beam passed through the second Fresnel lens is deflected.

3. A laser printer according to claim 2, wherein each ejecting end of the three-dimensional optical guides is positioned at a different predetermined distance from the center line at the ejecting end.

4. A laser printer according to claim 1, wherein the reflective element is a plane mirror.

5. A laser printer according to claim 1, wherein the laser beam emitting element is a semi-conductor laser element and the deflective element is a solid state deflective element.

6. A laser printer according to claim 5, wherein the semi-conductor laser element and the solid state deflective element are integrally constructed.

* * * * *

UNITED STATES PATENT AND TRADEMARK OFFICE
CERTIFICATE OF CORRECTION

PATENT NO. : 4,841,311

DATED : June 20, 1989

INVENTOR(S) : SUZUKI et al.

It is certified that error appears in the above-identified patent and that said Letters Patent is hereby corrected as shown below:

On the title page:

Section [75], line 2, change "Urukawa" to --Furukawa--.

Signed and Sealed this

Third Day of April, 1990

Attest:

HARRY F. MANBECK, JR.

*Attesting Officer*   *Commissioner of Patents and Trademarks*